United States Patent Office 3,458,513
Patented July 29, 1969

3,458,513
2-SUBSTITUTED-TETRAHYDRO-HALO-SULFAMYL-QUINAZOLINONES
Bola Vithal Shetty, Rochester, N.Y., assignor to Wallace and Tiernan, Inc., East Orange, N.J., a corporation of Delaware
No Drawing. Continuation-in-part of application Ser. No. 517,995, Jan. 3, 1966. This application Nov. 2, 1967, Ser. No. 680,043
Int. Cl. C07d 51/48; A61k 27/00
U.S. Cl. 260—256.5          7 Claims

ABSTRACT OF THE DISCLOSURE

A 1,2,3,4-tetrahydro-halo-sulfamyl - 4 - quinazolinone compound having diuretic properties with low potassium excretion, characterized by having in the 3-position a substituted or unsubstituted aryl or aralkyl group, and by having in the 2-position a substituted or unsubstituted alkoxy or alkoxyalkyl group.

---

This application is a continuation-in-part of copending application Ser. No. 517,995, filed Jan. 3, 1966, now U.S. Patent 3,360,518, the disclosure of which is hereby incorporated by reference.

This invention relates to 1,2,3,4-tetrahydro-6-sulfamyl-3 aryl or aralkyl-4-quinazolinone compounds having diuretic properties, and more particularly to such compounds substituted in the 7-position with halogen or haloalkyl and in the 2-position with alkoxy, alkoxyalkyl, or such radicals substituted with halogen, cycloalkyl or phenyl.

In applicant's aforesaid copending application, now U.S. Patent No. 3,360,518 there are disclosed, but not claimed, compounds of the above type as diuretics. However, these compounds were so different from the compounds claimed that further work on the compounds disclosed and related compounds was deemed advisable before attempting to obtain patent coverage.

In accordance with this invention, 1,2,3,4-tetrahydro-7-halo or haloalkyl-6-sulfamyl-3 aryl or aralkyl-4-quinazolinone compounds have in the 2-position alkoxy, cycloalkoxy, phenylalkoxy or such groups having halogen substituted therein.

The compositions of this invention are preferably of the following formula:

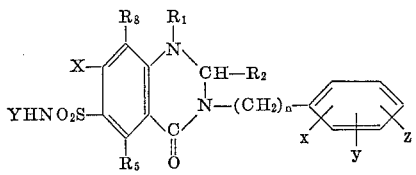

in which X is halogen or trifluoromethyl, Y is hydrogen or loweralkyl, $R_1$ is hydrogen, loweralkyl, or phenylloweralkyl, $R_2$ is loweralkoxy, loweralkoxyloweralkyl, halogen substituted loweralkoxy or halogen substituted loweralkoxyalkyl, lowercycloalkylloweralkoxy, lowercycloalkylloweralkoxyloweralkyl, or one or both substituted in the alkylalkoxy or cycloalkyl group with a halogen or in the cycloalkyl group with a loweralkyl, phenylloweralkoxy or phenylloweralkoxyloweralkyl, $R_5$ and $R_8$ are any of the members of hydrogen, loweralkyl, loweralkoxy or loweralkoxyloweralkyl; $x$ is hydrogen, loweralkyl, hydroxy, loweralkoxy, loweralkoxyloweralkyl, $NH_2$, $SO_2NH_2$, halogen or trifluoromethyl, $y$ and $z$ are any of $x$, and $n$ is an integer from 0–4.

The terms loweralkyl and loweralkoxy mean radicals having not more than 8 carbon atoms in a straight alkyl chain, and the term lowercycloalkyl means a cycloalkyl having not more than 8 carbon atoms in the cycloalkyl ring.

In the above formula X is preferably chlorine or trifluoromethyl, but bromine and the other halogens are not precluded. $R_1$ is preferably hydrogen, but lower alkyls such as methyl, ethyl, propyl, and isopropyl may be used. $R_2$ is preferably methoxy or methoxymethyl. $R_5$ is preferably hydrogen with $R_8$ being methyl, or $R_8$ is hydrogen with $R_5$ being methyl. $x$, $y$, and $z$ may be any of the stated radicals in one or more of the ortho, meta or para positions. Preferably $x$ is methyl in the ortho position, also where sulfamyl is used it is preferably present in the meta or para position with methyl in the ortho position.

Specific suitable compounds of the above formula include 2-methoxy-3-o-tolyl-6-sulfamyl-7-chloro-1,2,3,4-tetrahydro-4-quinazolinone;
2-methoxy-3-o-tolyl-6-sulfamyl-7-trifluoromethyl-1,2,3,4-tetrahydro-4-quinazolinone;
2-ethoxy-3-o-tolyl-6-sulfamyl-7-trifluoromethyl-1,2,3,4-tetrahydro-4-quinazolinone;
2-ethoxymethyl-3-o-tolyl-6-sulfamyl-7-chloro-1,2,3,4-tetrahydro-4-quinazolinone;
2-methoxy-3-o-tolyl-6-methylaminosulfonyl-6-chloro-1,2,3,4-tetrahydro-4-quinazolinone;
2-methoxy-3-(p-chlorophenyl)-6-sulfamyl-7-chloro-1,2,3,4-tetrahydro-4-quinazolinone;
2-methoxy-3-o-tolyl-6-methylaminosulfonyl-7-chloro-1,2,3,4-tetrahydro-4-quinazolinone;
2-methoxy-3-phenyl-6-sulfamyl-7-chloro-1,2,3,4-tetrahydro-4-quinazolinone;
2-methoxy-3-(2'-methyl-3'-chlorophenyl)-6-sulfamyl-7-chloro-1,2,3,4-tetrahydro-4-quinazolinone;
2-methoxy-3-(p-chlorophenyl)-6-methylaminosulfonyl-7-chloro-1,2,3,4-tetrahydro-4-quinazolinone;
2-methoxy-3-(2'-methylbenzyl)-6-sulfamyl-7-chloro-1,2,3,4-tetrahydro-4-quinazolinone;
2-phenylmethoxy-3-o-tolyl-6-sulfamyl-7-chloro-1,2,3,4-tetrahydro-4-quinazolinone;
2-ethoxymethyl-3-o-tolyl-6-sulfamyl-7-chloro-1,2,3,4-tetrahydro-4-quinazolinone;
2-methoxybutyl-3-o-tolyl-6-sulfamyl-7-chloro-1,2,3,4-tetrahydro-4-quinazolinone;
2-methoxypropyl-3-o-tolyl-6-sulfamyl-7-trifluoromethyl-1,2,3,4-tetrahydro-4-quinazolinone;
2-phenylmethoxymethyl-3-o-tolyl-6-sulfamyl-7-chloro-1,2,3,4-tetrahydro-4-quinazolinone;
2-chloromethyoxy-3-o-tolyl-6-sulfamyl-7-chloro-1,2,3,4-tetrahydro-4-quinazolinone;
2-dichloromethoxy-3-o-tolyl-6-sulfamyl-7-chloro-1,2,3,4-tetrahydro-4-quinazolinone;
2-trichloromethoxy-3-o-tolyl-6-sulfamyl-7-chloro-1,2,3,4-tetrahydro-4-quinazolinone;
2-benzylmethoxyethyl-3-o-tolyl-6-sulfamyl-7-chloro-1,2,3,4-tetrahydro-4-quinazolinone;
2-methoxy-3-(o-hydroxphenyl)-6-sulfamyl-7-chloro-1,2,3,4-tetrahydro-4-quinazolinone;
2-methoxy-3-(o-methoxyphenyl)-6-sulfamyl-7-chloro-1,2,3,4-tetrahydro-4-quinazolinone;
2-methoxy-3-(p-aminophenyl)-6-sulfamyl-7-chloro-1,2,3,4-tetrahydro-4-quinazolinone;

2-methoxy-3-(2'-methyl-4'-aminophenyl)-6-sulfamyl-
  7-chloro-1,2,3,4-tetrahydro-4-quinazolinone;
2-methoxy-3-(2'-methyl-3'-sulfamylphenyl)-6-sulfamyl-
  7-chloro-1,2,3,4-tetrahydro-4-quinazolinone;
2-methoxy-3-(2'-methyl-3'-sulfamyl-phenyl)-6-sulfamyl-
  7-trifluoromethyl-1,2,3,4-tetrahydro-4-quinazolinone;
2-methoxymethyl-3-(2'-methyl-3'-chlorophenyl)-6-
  sulfamyl-7-trifluoromethyl-1,2,3,4-tetrahydro-4-
  quinazolinone;
2-methoxy-3-(2'-methyl-3'-chlorophenyl)-6-methyl-
  amino-sulfonyl-7-chloro-1,2,3,4-tetrahydro-4-
  quinazolinone;
2-ethoxy-3-(2'-sulfamylphenyl)-6-sulfamyl-7-chloro-
  1,2,3,4-tetrahydro-4-quinazolinone;
2-cyclopentyloxy-3-o-tolyl-6-sulfamyl-7-chloro-
  1,2,3,4-tetrahydro-4-quinazolinone;
2-cyclobutylmethoxy-3-o-tolyl-6-sulfamyl-7-chloro-
  1,2,3,4-tetrahydro-4-quinazolinone;
2-cyclobutylmethylmethoxy-3-o-tolyl-6-sulfamyl-7-
  trifluoromethyl-1,2,3,4-tetrahydro-4-quinazolinone;
2-cyclopropylmethoxy-3-o-tolyl-6-sulfamyl-7-chloro-
  1,2,3,4-tetrahydro-4-quinazolinone;
2-cyclopropoxy-3-o-tolyl-6-sulfamyl-7-trifluoromethyl-
  1,2,3,4-tetrahydro-4-quinazolinone;
2-methoxy-3-benzyl-6-sulfamyl-7-chloro-1,2,3,4-
  tetrahydro-4-quinazolinone;
2-cyclohexyloxymethyl-3-o-tolyl-6-sulfamyl-7-chloro-
  1,2,3,4-tetrahydro-4-quinazolinone;
1-methyl-2-methoxy-3-o-tolyl-6-sulfamyl-7-chloro-
  1,2,3,4-tetrahydro-4-quinazolinone;
1-benzyl-2-methoxymethyl-3-o-tolyl-6-sulfamyl-7-chloro-
  1,2,3,4-tetrahydro-4-quinazolinone;
2-methoxymethyl-3-(2'-methyl-4'-chlorophenyl)-6-
  sulfamyl-7-chloro-1,2,3,4-tetrahydro-4-quinazolinone;
2-cyclobutylmethoxymethyl-3-o-tolyl-6-sulfamyl-7-chloro-
  1,2,3,4-tetrahydro-4-quinazolinone;
2-methoxymethyl-3-(2'-trifluoromethyl-4'-aminophenyl)-
  6-sulfamyl-7-chloro-1,2,3,4-tetrahydro-4-quinazolinone;
the sodium salt of 2-methoxymethyl-3-o-tolyl-
  6-sulfamyl-7-chloro-1,2,3,4-tetrahydro-4-quinazolinone;
and the potassium salt of 2-methoxymethyl-3-o-tolyl-
  6-sulfamyl-7-chloro-1,2,3,4-tetrahydro-4-
  quinazolinone.

The following table gives in tabular form many suitable compounds of this invention.

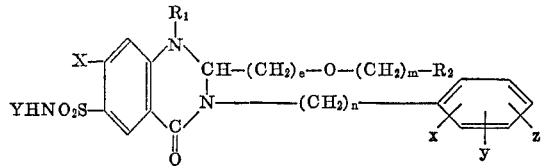

| R₁ | R₂ | x | y | z | e | m | n | X | Y |
|---|---|---|---|---|---|---|---|---|---|
| H | H | H | H | H | 1 | 1 | 0 | Cl | H |
| H | H | H | H | H | 2 | 1 | 0 | Cl | H |
| H | H | H | H | H | 3 | 1 | 0 | Cl | H |
| H | H | H | H | H | 4 | 1 | 0 | Cl | H |
| H | H | H | H | H | 5 | 1 | 0 | Cl | H |
| H | H | H | H | H | 6 | 1 | 0 | Cl | H |
| H | H | H | H | H | 1 | 2 | 0 | Cl | H |
| H | H | H | H | H | 2 | 2 | 0 | Cl | H |
| H | H | H | H | H | 3 | 2 | 0 | Cl | H |
| H | H | H | H | H | 4 | 2 | 0 | Cl | H |
| H | H | H | H | H | 5 | 2 | 0 | Cl | H |
| H | H | H | H | H | 6 | 2 | 0 | Cl | H |
| H | H | 2-Me | H | H | 1 | 1 | 0 | Cl | H |
| H | H | 2-Me | H | H | 2 | 1 | 0 | Cl | H |
| H | H | 2-Me | H | H | 3 | 1 | 0 | Cl | H |
| H | H | 2-Me | H | H | 4 | 1 | 0 | Cl | H |
| H | H | 2-Me | H | H | 5 | 1 | 0 | Cl | H |
| H | H | 2-Me | H | H | 6 | 1 | 0 | Cl | H |
| H | H | 2-Me | H | H | 1 | 2 | 0 | Cl | H |
| H | H | 2-Me | H | H | 2 | 2 | 0 | Cl | H |
| H | H | 2-Me | H | H | 3 | 2 | 0 | Cl | H |
| H | H | 2-Me | H | H | 4 | 2 | 0 | Cl | H |
| H | H | 2-Me | H | H | 5 | 2 | 0 | Cl | H |
| H | H | 2-Me | H | H | 6 | 2 | 0 | Cl | H |
| Me | H | 2-Me | H | H | 1 | 1 | 0 | Cl | H |
| Ph | H | 2-Me | H | H | 1 | 1 | 0 | Cl | H |
| PhCH₂ | H | 2-Me | H | H | 1 | 1 | 0 | Cl | H |
| H | H | 2-Me | H | H | 1 | 1 | 1 | Cl | H |
| H | H | 2-Me | H | H | 1 | 1 | 2 | Cl | H |
| H | H | 2-Me | H | H | 1 | 1 | 3 | Cl | H |
| H | H | 2-Me | H | H | 1 | 1 | 4 | Cl | H |
| H | H | 2-Me | H | H | 1 | 1 | 5 | Cl | H |
| H | H | 2-Me | H | H | 1 | 1 | 6 | Cl | H |
| H | H | 2-Me | H | H | 1 | 1 | 0 | Br | H |
| H | H | 2-Me | H | H | 1 | 1 | 0 | F | H |
| H | H | 2-Me | H | H | 1 | 1 | 0 | CF₃ | H |
| H | H | 2-Me | H | H | 1 | 1 | 0 | Cl | Me |
| H | H | 2-Me | 3-Me | H | 1 | 1 | 0 | Cl | H |
| H | H | 2-Me | 3-Me | 4-Me | 1 | 1 | 0 | Cl | H |
| H | H | 2-Cl | H | H | 1 | 1 | 0 | Cl | H |
| H | H | 2-Cl | 3-NH₂ | H | 1 | 1 | 0 | Cl | H |
| H | H | 2-Me | H | 4-OH | 1 | 1 | 0 | Cl | H |
| H | H | 2-Me | H | 4-OMe | 1 | 1 | 0 | Cl | H |
| H | H | 2-Me | 4-NH₂ | H | 1 | 1 | 0 | Cl | H |
| H | H | 2-Me | H | H | 0 | 1 | 0 | Cl | H |
| H | H | 2-Me | H | H | 0 | 2 | 0 | Cl | H |

NOTE.—Me=Methyl, Ph=Phenyl.

The following example illustrates the compounds and methods of preparation:

EXAMPLE I

Synthetic Scheme

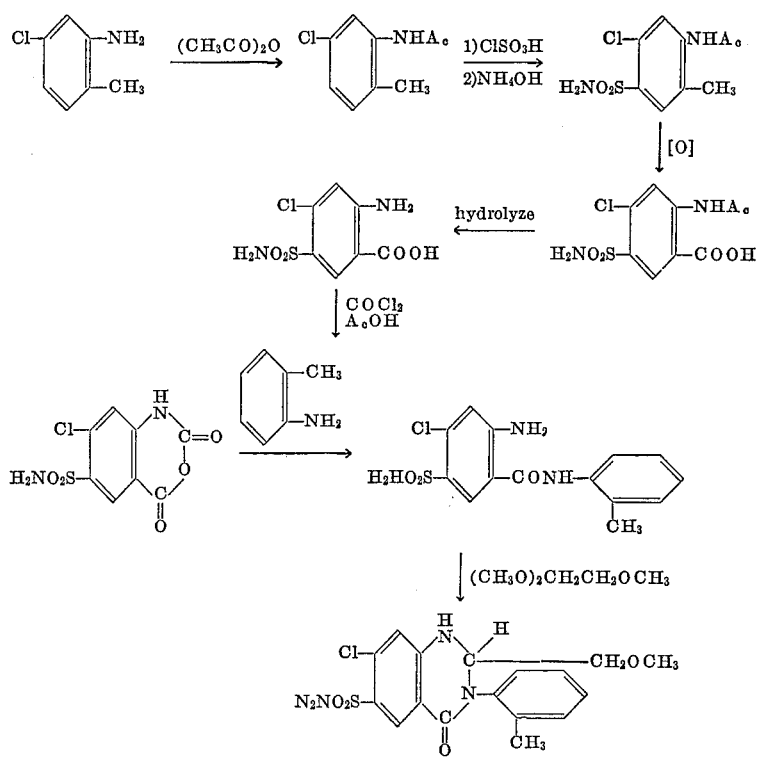

Preparation of the compound 2-methoxymethyl-3-o-tolyl-6-sulfamyl-7-chloro-1,2,3,4-tetrahydro-4-quinazolinone 2-amino-4-chloro-5-sulfamyl-N-(o-tolyl) benzamide (33.92.) was suspended in 300 ml. acetic acid and heated to 70°. Concentrated sulfuric acid (0.7 ml.) was added and then 1,2,2-trimethoxyethane (14 g.) was added dropwise during 3 minutes. The solid rapidly dissolved and the temperature was maintained for 10 minutes. The heat source was removed and after 20 minutes the reaction was cooled to room temperature and poured into 1 liter of water. The precipitate was filtered and dried to give 30 g. of crude product. The product was refluxed with chloroform and filtered and the solid purified by chromatography followed by recrystallization from alcohol. M.P. 154–6.

Calculated for $C_{17}H_{18}ClN_3O_4S+1.1\%$ $H_2O$: C, 51.00; H, 4.69; N, 10.50. Found: C, 51.05; H, 4.47; N, 10.70.

The other compounds of this invention can be made by modification of ingredients and quantities of the above example as is well understood by those skilled in the art.

From pharmacology tests run on 2-methoxymethyl-3-o-tolyl-6-sulfamyl-7-chloro-1,2,3,4-tetrahydro-4(3H)-quinazolinone (compound 751–263) and other indications and analogy applicant states that the compounds of this invention coming under the claims are effective diuretics, saluretics, and antihypertensives with low toxicity. For example, the following is a summary of the pharmacology on compound S751–263:

I.—Summary

Compound S751–263 (2-methoxymethyl-3-(o-tolyl)-6-sulfamyl-7-chloro-1,2,3,4-tetrahydro-4-quinazolinone) was compared with hydrochlorothiazide for its diuretic, natruiretic and kaliuretic properties by a rat assay.

The diuretic and natriuretic properties of this compound appear to be equivalent to those of hydrochlorothiazide. The $Na^+$ to $K^+$ output ratio is apparently more favorable than that of hydrochlorothiazide.

II.—Experimental procedures

The basic assay method was that of Lipschitz, Hadidian, and Kerpcsar, J. Pharm. and Exp. Therap. 77:97. Briefly, the method is as follows: four over-night fasted, Sprague-Dawley, albino rats were placed in each of ten stainless steel, nitric acid-washed metabolism cages. Two cages of animals were used as controls and were subjected to all procedures except dosing with compounds. All rats received an initial I.P. hydration of 2.5 cc. de-ionized water per 100 grams of animal weight. This was followed 2 hours later by 2.5 cc. of 0.9% saline per 100 g. of animal weight given by stomach tube. With this saline load, the compounds dissolved as 2% solutions in 0.2 N NaOH were also administered. The amount of NaOH per 100 g. of rat was kept constant. Control animals received all substances except the compounds.

Urine was collected under light mineral oil for 4 hours and analyzed for volume, $[Na^+]$, $[K^+]$, and $[Cl^-]$.

Appropriate calculations were done to convert the output of urinary volume, $Na^+$, $K^+$, and $Cl^-$ into mcl. or mceq./kg./4 hr.

Compound 751–263 (Lot #751–263), a white powdery substance, was received from the Pharmaceutical Chemistry Department in an amber bottle and stored in a refrigerator. Hydrochlorothiazide (HCTZ), Lot #L581091-0-57, was obtained from Merk, Sharp and Dohme Research Laboratory and refrigerated.

The doses in mg./kg. administered were as follows: HCTZ: 0.10, 0.32, 1.00, 3.20. 751–263: 0.10, 1.00, 10.00, 100.00.

III.—Experimental results

The various urinary outputs, calculated as described above, were plotted against the log of the doses. These dose-response curves are presented in FIGURES 1, 2, 3, and 4 for volume, $Na^+$, $K^+$, and $Cl^-$ respectively.

For approximate potency comparisons, the distance between the steep portions of the dose-response curves were measured. Assigning a value of 1 for the response to HCTZ, the potencies of 751–263 compared with HCTZ for the various parameters of renal function are as follows:

| | |
|---|---|
| Volume | Approximately equal. |
| $Na^+$ | 3. |
| $K^+$ | Approximately equal. |
| $Cl^-$ | 2. |

From these data compound 751–263 appears to be as potent a diuretic and natriuretic agent as hydrochlorothiazide with evidence of a more favorable $Na^+$ to $K^+$ output ratio.

No overt evidence of toxicity was seen in the test animals.

In the preceding specification the temperature, wherever given, are in degrees centigrade.

Various modifications of the structural formula on page 1 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3 position, and alkoxy, cycloalkoxy, or phenylalkoxy in the 2 positions.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:

1. A compound of the formula:

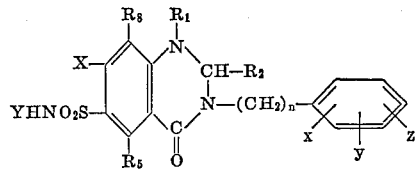

or any of their pharmaceutically acceptable salts, in which X is halogen or trifluoromethyl, Y is hydrogen or loweralkyl, $R_1$ is hydrogen or loweralkyl, or phenylloweralkyl, $R_2$ is loweralkoxy, loweralkoxyloweralkyl, halogen substituted loweralkoxy or loweralkoxyloweralkyl, lowercycloalkylloweralkoxy, lowercycloalkylloweralkoxyloweralkyl or one or both of said radicals substituted in the alkyl, alkoxy or cycloalkyl groups with a halogen, or in the cycloalkyl group with a loweralkyl; phenylloweralkoxy, or phenylloweralkoxyloweralkyl, $R_5$ and $R_8$ are any of the members of hydrogen loweralkyl, loweralkoxy, or loweralkoxyloweralkyl, $x$ is hydrogen, loweralkyl, hydroxy, loweralkoxy, loweralkoxyloweralkyl, $NH_2$, sulfamyl, halogen, or trifluoromethyl, $y$ and $z$ are any of the members of $x$, and $n$ is an integer from 0–4.

2. The compound of claim 1 wherein $R_2$ is a loweralkoxy or loweralkoxyloweralkyl.

3. The compound of claim 1 wherein X is chlorine, Y is hydrogen, $R_1$ is hydrogen, $R_2$ is methoxy, $R_5$ and $R_8$ are hydrogen, $x$ is orthomethyl, both $y$ and $z$ are hydrogen, and $n$ is 0.

4. The compound of claim 1 wherein X is chlorine, Y is hydrogen, $R_1$ is hydrogen, $R_2$ is methoxymethyl, $R_5$ and $R_8$ are hydrogen, $x$ is orthomethyl, both $y$ and $z$ are hydrogen, and $n$ is 0.

5. The compound of claim 1 wherein X is chlorine, Y is hydrogen, $R_1$ is hydrogen, $R_2$ is chloromethoxymethyl, $R_5$ and $R_8$ are hydrogen, $x$ is orthomethyl, both $y$ and $z$ are hydrogen, and $n$ is 0.

6. The compound of claim 1 wherein X is chlorine, Y is hydrogen, $R_1$ is hydrogen, $R_2$ is methoxymethyl, $R_5$ and $R_8$ are hydrogen, $x$ is orthotrifluoromethyl, both $y$ and $z$ are hydrogen, and $n$ is 0.

7. The compound of claim 1 wherein X is trifluoromethyl, Y is hydrogen, $R_1$ is hydrogen, $R_2$ is methoxymethyl, $R_5$ and $R_8$ are hydrogen, $x$ is orthomethyl, both $y$ and $z$ are hydrogen, and $n$ is 0.

References Cited

UNITED STATES PATENTS

| | | |
|---|---|---|
| 3,133,918 | 5/1964 | MacPhillamy et al. |
| 3,291,794 | 12/1966 | Huebner. |
| 3,297,693 | 1/1967 | De Stevens et al. |
| 3,324,121 | 6/1967 | Sprague. |
| 3,336,305 | 8/1967 | Scarborough et al. |
| 3,336,320 | 8/1967 | Doebee et al. |
| 3,341,520 | 9/1967 | Pfenninger. |
| 3,360,518 | 12/1967 | Shetty _____ 260—256.5 |

FOREIGN PATENTS

| | | |
|---|---|---|
| 692,082 | 4/1967 | Belgium. |

ALEX MAZEL, Primary Examiner

R. J. GALLAGHER, Assistant Examiner

U.S. Cl. X.R.

424—251

PO-1050
(5/69)

UNITED STATES PATENT OFFICE
CERTIFICATE OF CORRECTION

Patent No. 3,458,513          Dated July 29, 1969

Inventor(s) Bola Vithal Shetty

It is certified that error appears in the above-identified patent and that said Letters Patent are hereby corrected as shown below:

Claim 1, column 7, lines 50 and 51, insert a comma after "lowercycloalkylloweralkoxyloweralkyl" and in column 8, line 4, insert a comma after "hydrogen".

SIGNED AND SEALED

DEC 2 - 1969

(SEAL)
Attest:

Edward M. Fletcher, Jr.
Attesting Officer

WILLIAM E. SCHUYLER, JR.
Commissioner of Patents